United States Patent [19]

Geiser et al.

[11] Patent Number: 4,679,470
[45] Date of Patent: Jul. 14, 1987

[54] GUIDE-BAR DEVICE FOR MULTI-SPINDLE LATHE

[75] Inventors: Markus Geiser, Pery; Claude Vandevoir, La Neuveville, both of Switzerland

[73] Assignee: Sameca SA, Lamboing, Switzerland

[21] Appl. No.: 540,383

[22] Filed: Oct. 11, 1983

[30] Foreign Application Priority Data

Nov. 5, 1982 [EP] European Pat. Off. ........ 82810472.9

[51] Int. Cl.$^4$ ............................................. B23B 13/04
[52] U.S. Cl. ........................................... 82/2.7; 414/17
[58] Field of Search ................ 82/2.7, 2.5, 3; 414/17, 414/18, 14

[56] References Cited

U.S. PATENT DOCUMENTS

| | | |
|---|---|---|
| 2,548,786 | 4/1951 | Harney . |
| 3,823,628 | 7/1974 | Fortune ................................ 414/17 |
| 3,941,256 | 3/1976 | Doe et al. . |
| 3,945,506 | 3/1976 | Scheuer ............................... 414/17 |
| 4,352,615 | 10/1982 | Neukomm ........................... 414/17 |
| 4,421,446 | 12/1983 | Leon et al. ........................... 414/17 |

FOREIGN PATENT DOCUMENTS 2241378 8/1974 France .
1444849 8/1976 United Kingdom ............... 82/38 A Primary Examiner—Leonidas Vlachos
Attorney, Agent, or Firm—Marks Murase & White

[57] ABSTRACT

Guide-bar device for a multi-spindle lathe having a barrel indexed by the lathe at each machining operation and secured to a rear part of the lathe. The barrel comprises a central shaft and a plurality of guiding tubes removably supported by a means of disks provided on the central shaft, each guiding tube enclosing a bar to be machined. The bar rotates within the guiding tube in a fluid and is supported by and advanced under the influence of a piston which bears against the rear part of the bar. A fluid distributor is secured to the multi-spindle lathe at the rear part of the barrel. The fluid distributor is connected to at least one source of hydraulic pressure for distributing fluid under pressure into distributing grooves which are connected to a rear part of the guiding tubes for causing the piston to advance in said guiding tube and to a plurality of pipes connected to said guiding tubes for causing a radial injection of the fluid between said bar to be machined and the guiding tube thereof.

17 Claims, 7 Drawing Figures

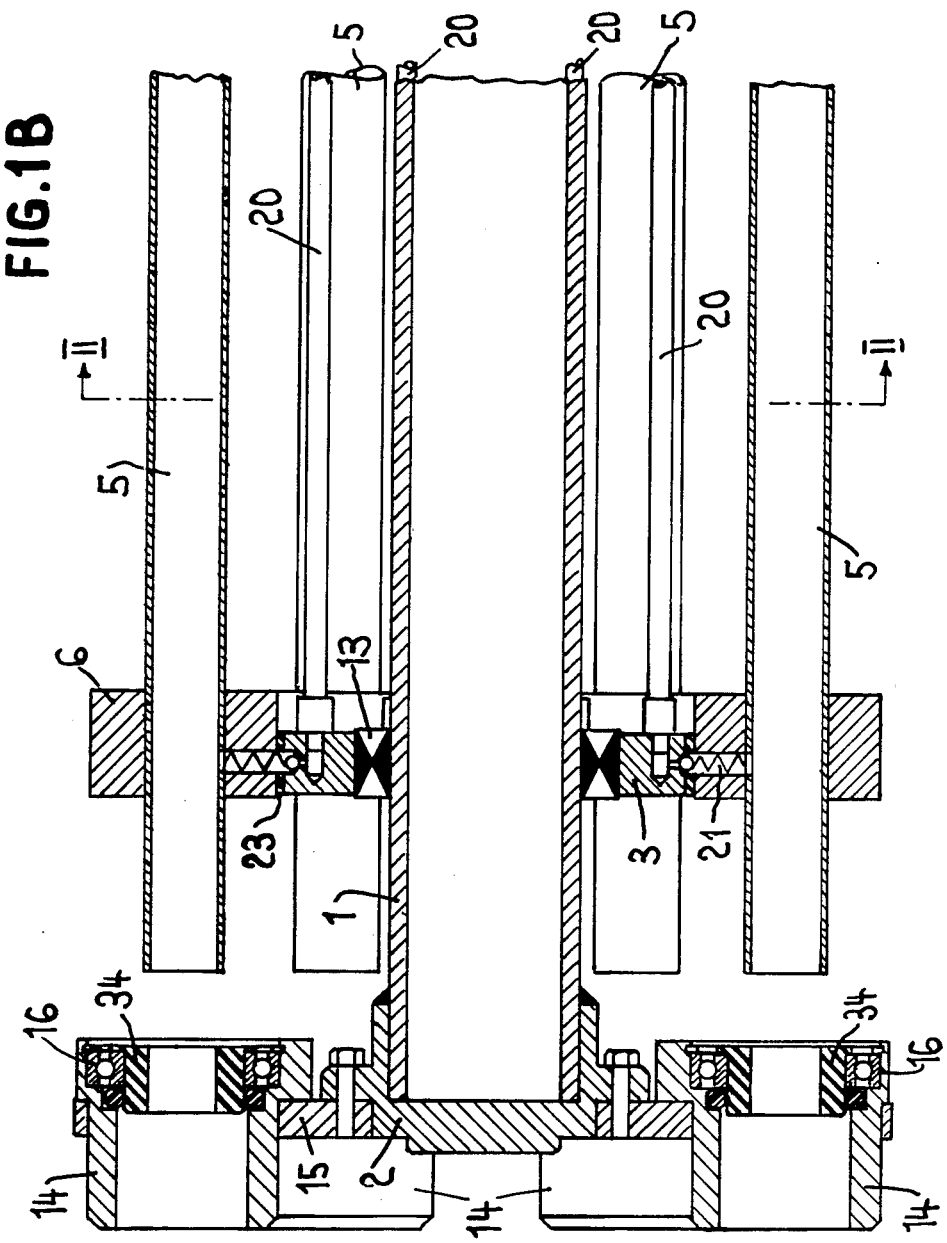

GUIDE-BAR DEVICE FOR MULTI-SPINDLE LATHE

BACKGROUND OF THE INVENTION

The present invention relates to a guide-bar device for a multi-spindle lathe and comprises a plurality of guiding tubes, each of which supports a bar to be machined while rotating in a fluid.

Generally speaking and until now, it was not possible, with a multi-spindle lathe, to reach spindle speeds as high as the speeds now obtained with the single spindle lathes of equal capacity. However, the technological evolution of cutting tools and oils and the imperatives of the market impose a clear need to increase the speed of rotation of multi-spindle lathe spindles. In this regard, the technical evolution of the guide-bar devices for multi-spindle lathes shall, in the future, plat a prominent part, due to the fact that the mechanical devices presently in service cannot follow the potential multi-spindle lathes spindle speeds. The production capacity of multi-spindle lathes therefore depends to a large extent on improvements in guide-bar devices. The purpose of the present invention is to provide precisely such an improvement.

Known devices comprise a barrel of steel tubes, the feed of the bar being generally provided by a feed collet located at the lathe head. Due to relatively low speeds of rotation, it is relatively easy to absorb the noise created by the vibrations of the rotating bars, either by placing insulating materials around the tubes of the barrel, or by upholstering the whole aggregate in order to suppress noise from eminating toward the outside. These sound dampening means however are not satisfactory because the noise is the result of vibration and that even if one could provide perfect acoustic insulation, it would still not suppress vibrations int he bars which are transmitted along the bars to the area where the bars are machined. These vibrations degrade in the surface finish, make it difficult to hold to prescribed tolerances, and cause deterioration of the cutting tools.

From the circular of Herrmann Forch Ing., 7000 Stuttgart 80 (Vaihingen), Hauptstrase 103, Germany, a system called PLO is known which consists of modifying existing guide-bars to permit the use of machine cutting oil or emulsion for lubricating both the bar to be machined and its guiding tube, in order to produce a film of oil or emulsion for damping any vibrations induced in the rotating bar. However, such a device is not satisfactory since the rear part of the bar is not supported or centered so that the bar floats and tends to hammer the internal wall of the guiding tube when rotating. This produces noise and vibrations which are transmitted along the bar to the area where the bar is machined. Moreoever, the machine operator is obliged to use the same oil or cooling water in the guide-bar as is utilized in the machining area of the bar. However, these two environments operate under conditions which are entirely inconsistent. Fluids which are capable of producing a hydrodynamic bearing in the guide-bar application are unlikely to have the same characteristics of viscosity, emulsion, and so on as the fluid (e.g., soap water) provided for cooling the cutting tools. Moreover, the guiding tubes of the known device(s) are generally of a mechanical-welded construction. The internal diameter of the tubes of the barrel are selected in terms of the maximum capacity of the lathe. Thus it is not possible to choose the internal diameter according to changing requirements. It is also known that for realizing a hydrodynamic support it is necessary to adapt the internal diameter of the tubes to the diameter and the profiles of the bars to be machined and this in terms of the speed sof rotation that one desires to attain. Due to the fact that known devices are intended to be adapted to an existing construction, it is often difficult or even impossible to recirculate the fluid coming out from the front and rear parts of the guiding tube.

It is therefore the object of the present invention to realize a guide-bar device for multi-spindle lathe which guides, and, as the case may be, feeds the bars to be machined while eliminating vibrations in these bars in order to reduce noise. The device is capable of being adapted to all existing bar dimensions and profiles and permits easy automatization of the provisioning of new bar stock.

SUMMARY OF THE INVENTION

To solve the above described problems, a guide-bar device according to the present invention comprises a fluid distributor for controlling the feed of a piston supporting the rear part of the bar in the guiding tube and for causing a lateral injection of lubricating fluid between the bar and the guiding tube. The fluid distributor is preferably disposed at the rear side of the guiding tubes.

Due to the fact that the bars are held and centered at their rear part by a piston and that they are, at least in their middle part, hydrodynamically supported in their respective guiding tube, rod vibrations are signicantly reduced and the noise produced by the bar and guiding tube is smaller than that produced by the lathe. This permits use of the device in multi-spindle lathes turning at high speeds not previously attained and improves the accuracy of the machining. Due to the construction of the fluid distributor, provisioning of the bars is easy and rapid, thereby increasing production capacity. Since the piston is capable of controlling the feed of the bar in its tube, it is possible to eliminate the feed collet normally provided on multi-spindle lathes. The displacement of the distributor, when provisioning a new bar, may be very simply automated.

BRIEF DESCRIPTION OF THE DRAWINGS

The invention will be described further by way of example with reference to the accompanying drawings.

FIGS. 1A and 1B illustrate a longitudinal cross-section of the device,

DESCRIPTION OF THE PREFERRED EMBODIMENT

Figure 1A:
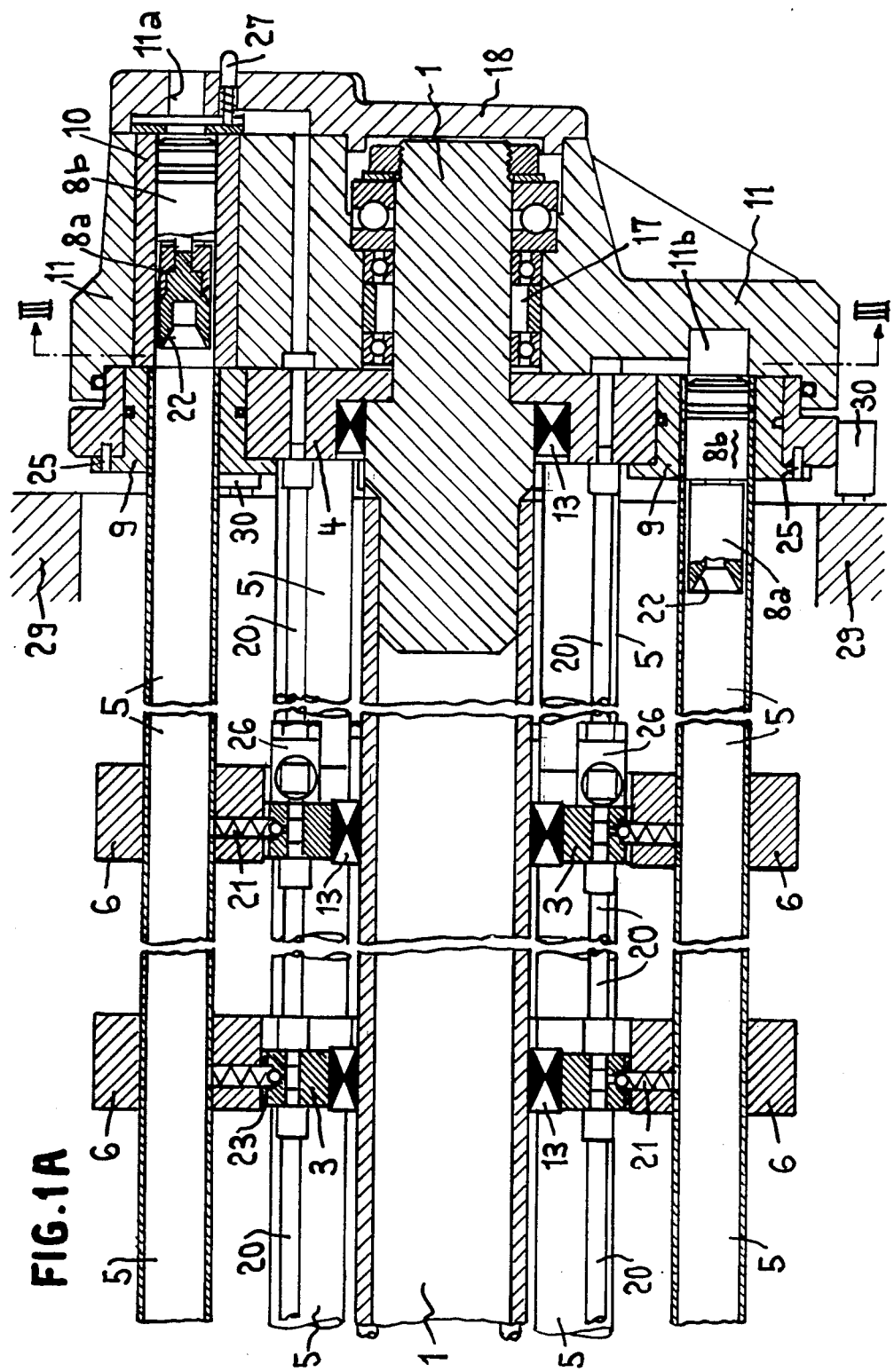
Figure 2:
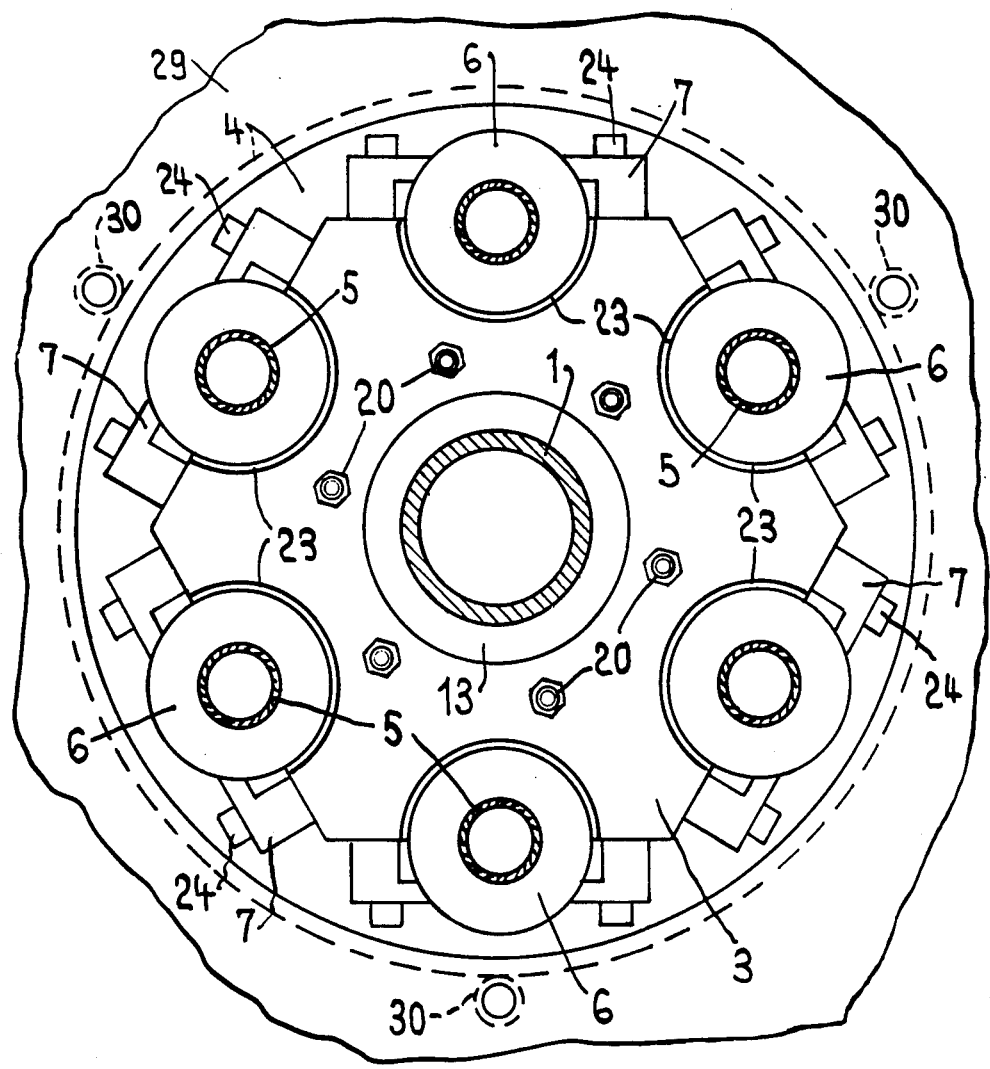
FIG. 2 is a cross-section of the device along the line II—II of FIG. 1.

The device comprises a barrel, a plurality of removable guiding tubes, and a hydraulic distributor. According to FIGS. 1A and 1B, the barrel comprises a central shaft 1, a front disk 2 which is intended to be fastened at the rear part of the multi-spindle lathe, intermediate disks 3 and a rear disk 4. The disks 3 and 4 are mounted on the central shaft by means of adjusting holding rings 13 for permitting an adjustment of the disks on the shaft. The guiding tubes 5 of the bar stock (not illustrated) are held in rings 6 supported by joints 23 on the intermediate disks 3 to which these rings are fastened by flanges 7 (FIG. 2). The disk 4 is fastened on a sleeve 9 intergral with the guiding tube 5. Hence, the disks 3 and 4 position and hold in place the guiding tubes 5. These tubes are removable and easily interchangeable in order to be adapted to the dimension of the bars to be machined. For removing one tube, it is sufficient to unscrew the bolts 24 which fasten the flanges 7. The flanges may then be pivoted 90° which permits the tube to be drawn toward the lathe head until the sleeve 9 is disengaged from the disk 4. The guiding tube may then be removed, the return valves 21 remaining fixed in the disks 3 which causes an interruption in the distribution of oil. After replacement with a new guiding tube is accomplished, the distribution of oil flow is restored.

The rear disk 4 is supported on the machine frame 29 by means of ball bearings 30. This frame holds the whole device in alignment with the multi-spindle lathe. On the disk 2 are mounted centering groins 14 fastened by flanges 15 to the disk 2. These centering groins comprise ball bearings 16 which, by means of removable supporting rings 34 having a diameter and profile adapted to the diameter and the profile of the bars to be machined, support the bars, between the piston end of the guiding tubes 5 and the lathe head (not represented). Thus, they serve as intermediate supports. the rings 34 are perfarably formed from deformable material capable of accepting any deformation of the bars and absorbing any vibrations.

Figure 3:
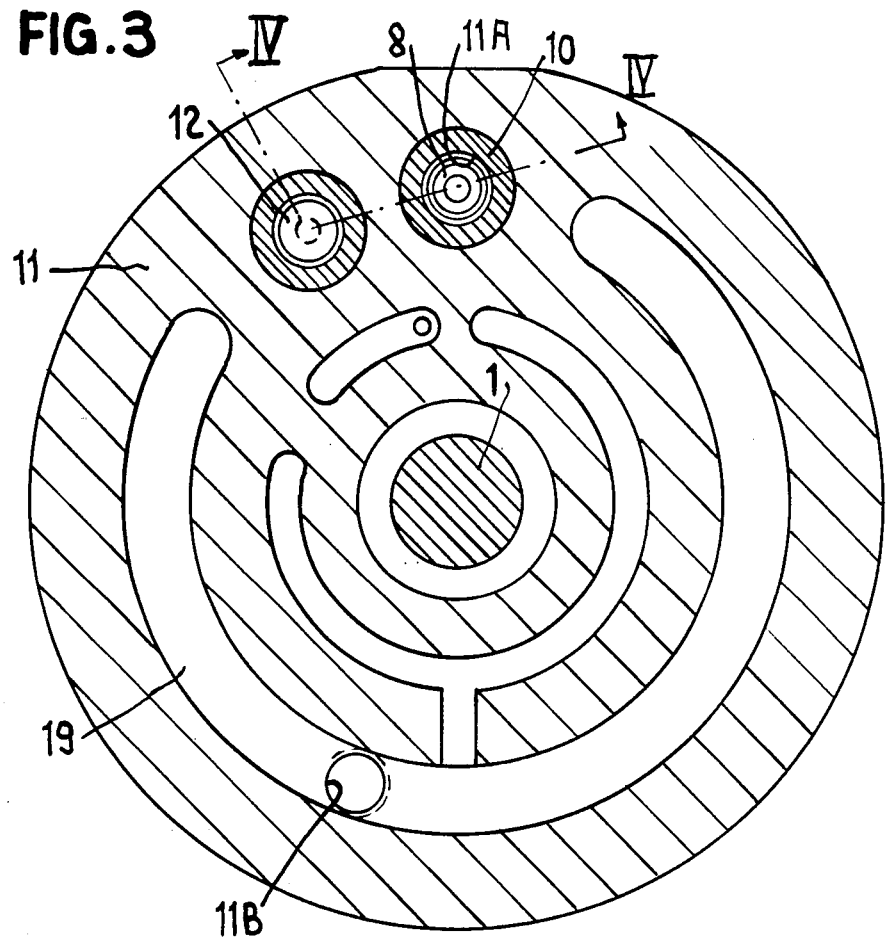
FIG. 3 is a cross-section of the device along the line III—III of FIG. 1.

The distributor 11, in form of a disk integral with the device, is located to the rear of the disk 4 and is mounted on the central shaft 1 by a bearing 17. It is closed at the back by a closing plate 18. The distributor functions to distribute oil under pressure, which is provided by a hydraulic system (not represented) preferably having more than one source of pressure, into the guiding tubes of the barrel. As illustrated in FIG. 1, the supply of oil is preferably provided by two sources of pressure. The first source of pressure supplies the inlet 11A, the inlet for introducing new bar stock into any guiding tube aligned with it. The inlet 11A is located in the closing plate 18. The second source of pressure is connected to the inlet 11B of the distributor for supplying fluid through grooves 19 (FIG. 3) to all other guiding tubes 5. From the inlets 11A and 11B, oil under pressure is distributed by pipes 20 to the intermediate disks 3 and from these disks, fluid is injected laterally through return valves between the internal wall of the guiding tubes and the bars to be machined which rotate in these tubes, thus hydrodynamically supporting at least the central part of the bars. Each pipe 20 is provided with a flow regulator 26.

Figure 4:
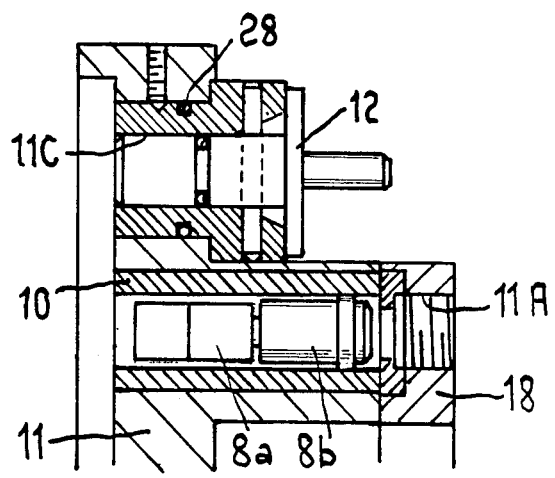
FIG. 4 is a cross-section of the device along the line IV—IV of FIG. 3.

According to FIG. 4, in the preferred embodiment, the distributor further includes an opening 11C provided for introducing of a new bar to be machined in an empty guiding tube in position for provisioning. A sleeve 10 which houses a piston 8A, 8B has an internal diameter similar to that of its associated guiding tube 5 and must be changed when the diameter of the guiding tubes 5 is changed. Of course, piston 8A, 8B has an outside diameter corresponding to the inside diameter of the sleeve 10 and is also changed when the sleeve is changed. In the provisioning position illustrated in FIG. 4, the length of the distributor housing opposite to the inlet 11A is such that it can accept the piston 8A, 8B when the latter is fully withdrawn from the guiding tube. The piston comprises a back part 8B which advances into the guiding tube due to the pressure of the hydraulic fluid but which does not rotate with respect to the tube, and a front part 8A capable of turning in a bearing carried by the back part 8B. The front part 8A of the piston rotates under the influence of the bar being machined against which it is pressed by the pressure of the fluid acting on the back part 8B.

The essential elements of the device being described above, the operation thereof will now be described. In the case of a normal operating cycle, a bar to be machined is engaged in each guiding tube 5. The distributor 11 is in the working position, with the inlet 11A facing the provisioning position of the bars. The lathe works in an automatic cycle which means that after each operation there is an indexing of the barrel which is driven by the multi-spindle lathe and advancing of the bar which is in the provisioning position. In FIG. 2 the barrel is illustrated with six guiding tubes 5 but it is obvious that it may comprise a different number of guiding tubes. The cycle progresses until one of the bars is completely machined. At this time, the lathe stops (there is no indexing anymore) and a signal "end of bar" indicating the lack of a bar is delivered. It is therefore necessary to introduce a new bar to be machined. At this time, the inlet 11A is placed under vacuum which causes the withdrawal of the piston which was located at the left end (as viewed in Figures 1A and 1B) of the empty guiding tubes. This piston enters the housing of the distributor provided to receive it as indicated in FIG. 1. During the withdrawal of the piston, all other guiding tubes remain under pressure supplied by the oil connected to the inlet 11B. As soon as the piston 8A, 8B of the empty tube is received in the housing of the distributor 11, an indication is delivered by, for example, a push-button 27, acting on, for example, a microswitch (not illustrated) and the distributor with the piston 8A, 8B is set into rotation manually or automatically about the axis of the central tube 1 in order to align the opening 11C with the empty tube. The plug 12, which closes the back part of the opening 11C, is removed and a new bar to be machined is introduced through this opening into the empty guiding tube. The plug 12 is then set back into its place, and the distributor 11 rotated about the axis of the central tube 1 until the opening 11A faces the tube which has just been provisioned. The pressure of oil is then applied to the inlet 11A causing the piston 8A, 8B to press against and support the back of the new bar. At this time, the machine again starts to operate normally and the machining progresses until the occurrence ofthe next "end of bar" signal.

During a normal operating cycle of the machine, the indexing is normally carried out in less than one second. In the course of the indexing operation, the pressure of the oil in the inlet 11a acting on the piston 8A, 8B which is in the tube leaving the working position is interrupted for a fraction of a second. However, this interruption has no influence on the operation of the device because the rear part of the guiding tube 5, which is filled with oil under pressure, and acts as an accumulator which maintains at least the required minimum oil pressure during the short interruption.

The passage of a tube from the provisioning position to the next position is executed through the position 11C and the plug 12 is made fluid-tight by a gasket 28 to prevent oil from escaping through the opening 11C during this operation.

In the device as described above, the rear part of the bars to be machined is continuously supported and centered by the front part 8A of the piston which rotates with the bars. This prevents the rear part of the bar from floating in its tube and hammering the internal wall of the tube. Morever, any vibrations of the bar, which is supported in front by the centering groin 14 and in back by the piston, are eliminated principally due to the hydrodynamic bearing which prevents physical contact between the rotating bar and the stationary guiding tube. This results in relatively silent working, the noise level of the device being less than that of a present multi-spindle lathe, an improvement in machining accuracy, and in the surface finish of the machined parts. Damage to cutting tools due to vibrations is also significantly reduced. Moreover, the hydrodynamic support, at least of the central part of the bars, combined with the significant reduction in vibration, permits the speed of rotation of the bars in the guiding tubes to be significantly increased over that currently possible. The cross-section of the bars to be machined is not limited to a circular cross-section. The device can accept other bars having e.g. a square or a hexagonal cross-section. The clearance between the bar and the internal wall of its guiding tube depends on the speed of rotation and it is normally between 2 and 6 mm, which permits a certain undulation of the central part of a long bar in its tube. However, due to the oil injected laterally between the bar and the internal wall of the tube by the return valves 21, the bar is prevented from physical contact with the wall. During normal working, the fluid contained in the tube, which is under a pressure caused by the turbulence created by the rotation of the bar through the above-mentioned clearance, flows out the left end (as viewed in FIG. 1B) of the guiding tube and is preferably recirculated through a closed circuit hydraulic system.

Figure 5:
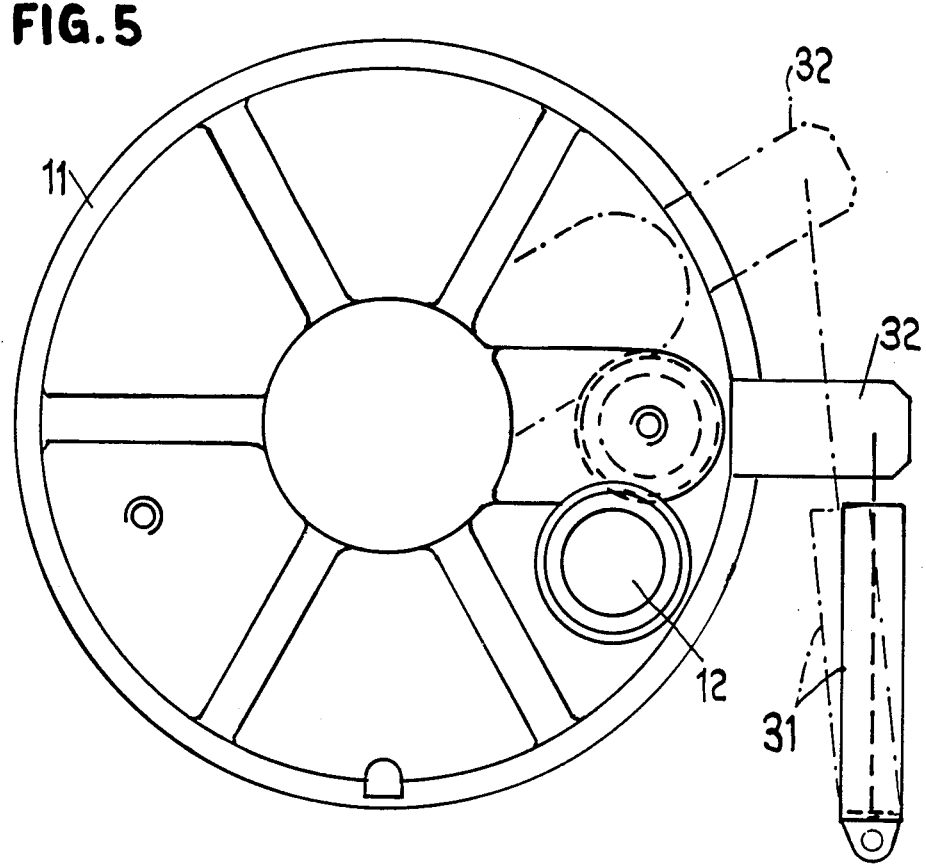
FIG. 5 schematically illustrates automatization of new bar stock provisioning, and FIG. 6 schematically illustrates the automatic insertion and withdrawl of a closing plug.
Figure 6:
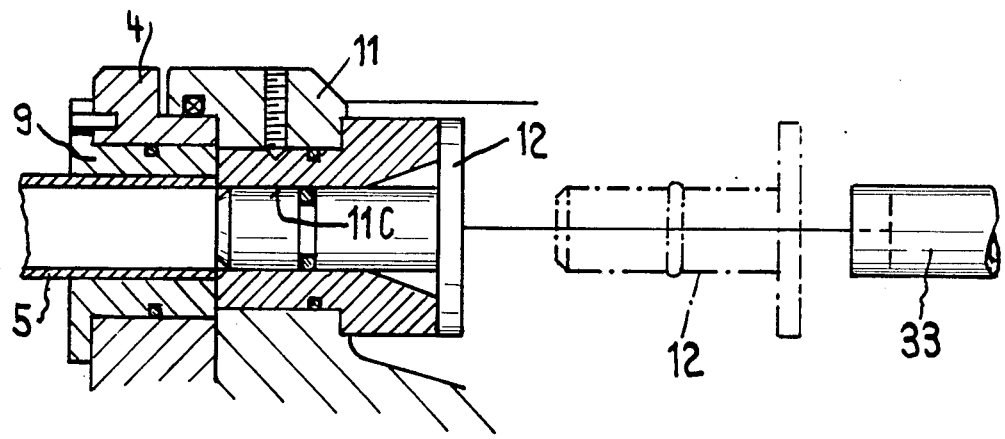

It has been mentioned above that the provisioning of the bars may be automated. In this case and according to FIGS. 5 and 6, at the time of appearance of the signal delivered by the push-button 27, a hydraulic or pneumatic control cylinder 33 withdraws the plug 12 which closes the opening 11C of the distributor. Then a second hydraulic or pneumatic control cyinder 31 (FIG. 5) actuates a lever 32 causing the radial displacement of the distributor 11 and bringing the opening 11C opposite to the empty tube to be provisioned in order to permit the insertion of a new bar, through the opening 11c, into the empty tube. Thus, through the utilization of a commercially available bar feeder one obtains fully automatic provisioning of the guide-bar device.

The device according to the invention also permits elimination of the feed collets normally encountered on multi-spindle lathes. To this end, it is only necessary to take the following measures. The pistons 8A, 8B must be made of a greater length in order to accomodate the distance between the centering groins 14 and the front part of the lathe head. The housing provided for the piston 8A, 8B in the distributor 11 must be made of equal length in order to accept the piston during the insertion of a new bar. The disadvantages or drawbacks of the feed collets are the following: they are expensive, they are subject to wear and require repair on replacement, they cause deterioration of the surface finish of the bar being machined, and they make it more difficult to introduce a new bar into the spindle. The elimination of feed collets may be regarded as a new and favorable contribution in the field of the multi-spindle lathes.

We claim:

1. A guide-bar device for a multi-spindle lathe operable to simultaneously machine a plurality of bar of stock, said guide bar device including a rotatable barrel carried by and operable to be indexed by the multi-spindle lathe so as to progressively perform various machining operations on said bar stock as said barrel rotates, said guide-bar device further comprising:
    a central shaft;
    front disk means coaxially disposed about and supporting said shaft and adapted to be supported by said lathe;
    a rear disk coaxially disposed about and supporting said shaft and adapted to be supported by said lathe;
    at least one intermediate disk coaxially disposed about said central shaft;
    a plurality of guiding tubes removably supported about said central shaft by means of said intermediate disk, said guiding tubes enclosing a bar sotck to be machined;
    hydraulic means, for simultaneously supporting and advancing the bar stock in each of said guiding tubes, said hydraulic means including means for introducing hydraulic fluid into said guiding tubes and means for rotatingly supporting a rear part of the bar stock in each of said guiding tubes and for progressively advancing the bar stock in each of said guiding tubes during said machining;
    at least one source of hydraulic fluid;
    a hydraulic fluid distributor connected to said source of hydraulic fluid; said hydraulic fluid distributor including means for distributing the hydraulic fluid to said hydraulic fluid introducing means and to said means for rotatingly supporting and advancing the bar stock.

2. The guide-bar device of claim 1, wherein said means for rotatingly supporting and advancing the bar stock comprises a plurality of pistons respectively associated with each of said plurality of guiding tubes, each of said pistons having a rotatable front portion for engaging a rear end of said bar stock to be machined and means, responsive to said hydraulic fluid for advancing said bar stock toward a spindle of said multispindle lathe.

3. The guide-bar device fo claim 1, wherein said hydraulic fluid introducing means comprises at least one fluid pipe and a plurality of injection means in fluid communication with said fluid pipe for radially injecting hydraulic fluid into said guiding tubes to provide hydrodynamic support for said bar stock.

4. The guide-bar device of claim 1, wherein said hydraulic fluid distributor includes distributing grooves for supplying hydraulic fluid to said hydraulic fluid introducing means and to said means for rotatingly supporting and advancing.

5. The guide-bar device of claim 4, further comprising a plurality of pressurized fluid sources, wherein said fluid distributor is provided with a single inlet for each of said pressurized fluid sources,e ach of said inlets communicating with said distributing grooves.

6. The guide-bar device of claim 2, wherein said fluid distributor further includes:
    a housing dimentioned to receive and engage the piston associated with an empty one of said guiding tubes, said distributor with the piston of said empty guiding tube engaged in said housing being operable to rotate about said central shaft;

a normally closed opening in said distributor for introducing new bar stock to be machined into said empty guiding tube; and means for rotating said distributor about said central shaft to align said normally closed opening and said empty guiding tube to thereby permit insertion of new bar stock through said normally closed opening into said empty guiding tube.

7. The guide-bar device of claim 6, further including a plug for closing said normally closed opening and means for controlling said plug to open and close said normally closed opening, a transducer for indicating when the piston associated with an empty guiding tube is engaged in said housing, said means for controlling said plug being responsive to a signal produced by said transducer, and wherein said means for rotating said distributor comprises means for automatically aligning said empty guiding tube with said normally closed opening.

8. The guide-bar device of claim 6, wherein said housing includes a sleeve for receiving said pistons and has an inside diameter dimentioned to match an outside diameter of a piston to be received.

9. The guide-bar device of claim 2, wherein said barrel further comprises centering groins mounted on said front disk between an outlet of said guiding tubes and a head stock of the multi-spindle lathe to which said device is adapted to be secured, said centering groins having deformable cushions for supporting the bar stock to be machined.

10. The guide-bar device of claim 9, wherein said pistons have a length corresponding to the distance between the centering groins and the head stock of the multi-spindle lathe to which said device is adapted to be secured.

11. The guide-bar device of claim 2, wherein the bar stock to be machined in said multi-spindle lathe is advanced under the exclusive control of said piston.

12. The guide-bar device of claim 1, further comprising mounting rings for mounting said guiding tubes in said barrel, said mounting rings having flanges secured to said intermediate disk by removable fastening means in order facilitate changing of a guiding tube.

13. The guide-bar device of claim 12, wherein said mounting rings support return valves on said intermediate disk, and wherein the removal of a guiding tube is operable to interrupt the flow of hydraulic fluid through said return valves and the replacement of a guiding tube is operable to restore hydraulic fluid flow via said return valves.

14. The guide-bar device of claim 7, wherein said means for controlling said plug comprises a hydraulically controlled cylinder.

15. The guide-bar of claim 7, wherein said means for controlling said plug comprises a pneumatic cylinder.

16. The guide-bar device of claim 7 wherein said means for rotating the distributor comprises a hydraulically controlled cylinder, and a lever connected to said cylinder for rotating said distributor.

17. The guide-bar device of claim 7, wherein said means for rotating the distributor comprises a pneumatically controlled cylinder, and a lever connected to said cylinder for rotating said distributor.

* * * * *